United States Patent [19]

Nguyen-Thai et al.

[11] Patent Number: 5,745,701
[45] Date of Patent: Apr. 28, 1998

[54] SECURITY PROTECTED SYSTEM FOR INTERCONNECTION OF LOCAL NETWORKS VIA A PUBLIC TRANSMISSION NETWORK

[75] Inventors: Binh Nguyen-Thai, Lannion; Marc Girault, Caen; Bruno Millan, Braon Sur Odon, all of France

[73] Assignees: France Telecom, Paris; La Poste, Boulogne Billancourt, both of France

[21] Appl. No.: 388,104

[22] Filed: Feb. 13, 1995

[30]  Foreign Application Priority Data

Feb. 14, 1994 [FR] France ................................... 9401645

[51] Int. Cl.⁶ ...................................................... G06F 15/16
[52] U.S. Cl. ...................................................... 395/200.79
[58] Field of Search ........................... 370/85.13; 395/200.02, 395/200.79

[56]  References Cited

U.S. PATENT DOCUMENTS

| 5,276,735 | 1/1994 | Boebert et al. ............................ 380/21 |
| 5,351,237 | 9/1994 | Shinohara et al. ........................ 370/392 |
| 5,426,637 | 6/1995 | Derby et al. ............................... 370/401 |

FOREIGN PATENT DOCUMENTS

| 0436799 | 7/1991 | European Pat. Off. . |
| 0511483 | 11/1992 | European Pat. Off. . |
| 0511497 | 11/1992 | European Pat. Off. . |
| 0573245 | 12/1993 | European Pat. Off. . |

OTHER PUBLICATIONS

Stevenson et al.; Design of a Key Agile Cryptographic System for OC–12c Rate ATM; 1995.
Network and Distributed System Security, 1995 Symposium; pp. 17–30.
Tardo et al.; SPX: Global Authentication Using Public Key Certificates; 1991.
Security and Privacy, 1991 IEEE Symposium; pp. 232–244.
Sundareshan et al., *Design and Deployment of an Integrated Data Ciphering Unit Inside a Low Bit Rate Voice Transcoder for Secure Voice Communications Over Telephone Networks*, vol. 3, Jun. 1989.

*Primary Examiner*—Parshotam S. Lall
*Assistant Examiner*—Kenneth R. Coulter
*Attorney, Agent, or Firm*—Nilles & Nilles SC

[57]  ABSTRACT

A system for interconneting local networks via a public transmission network, in which equipment items of the microcomputer type, connected to a local network A, are capable of being connected to the public network by a router X in order to communicate with one or more equipment items of the microcomputer type connected to at least one other local network B, which are capable of being linked to the public network by a router Y.

The system includes security protection of the establishment of the communications between the local networks over the public network, implementing a certificate exchange mechanism and the software procedures for active authentication, of the "challenge-response" type being placed in the routers.

18 Claims, 2 Drawing Sheets

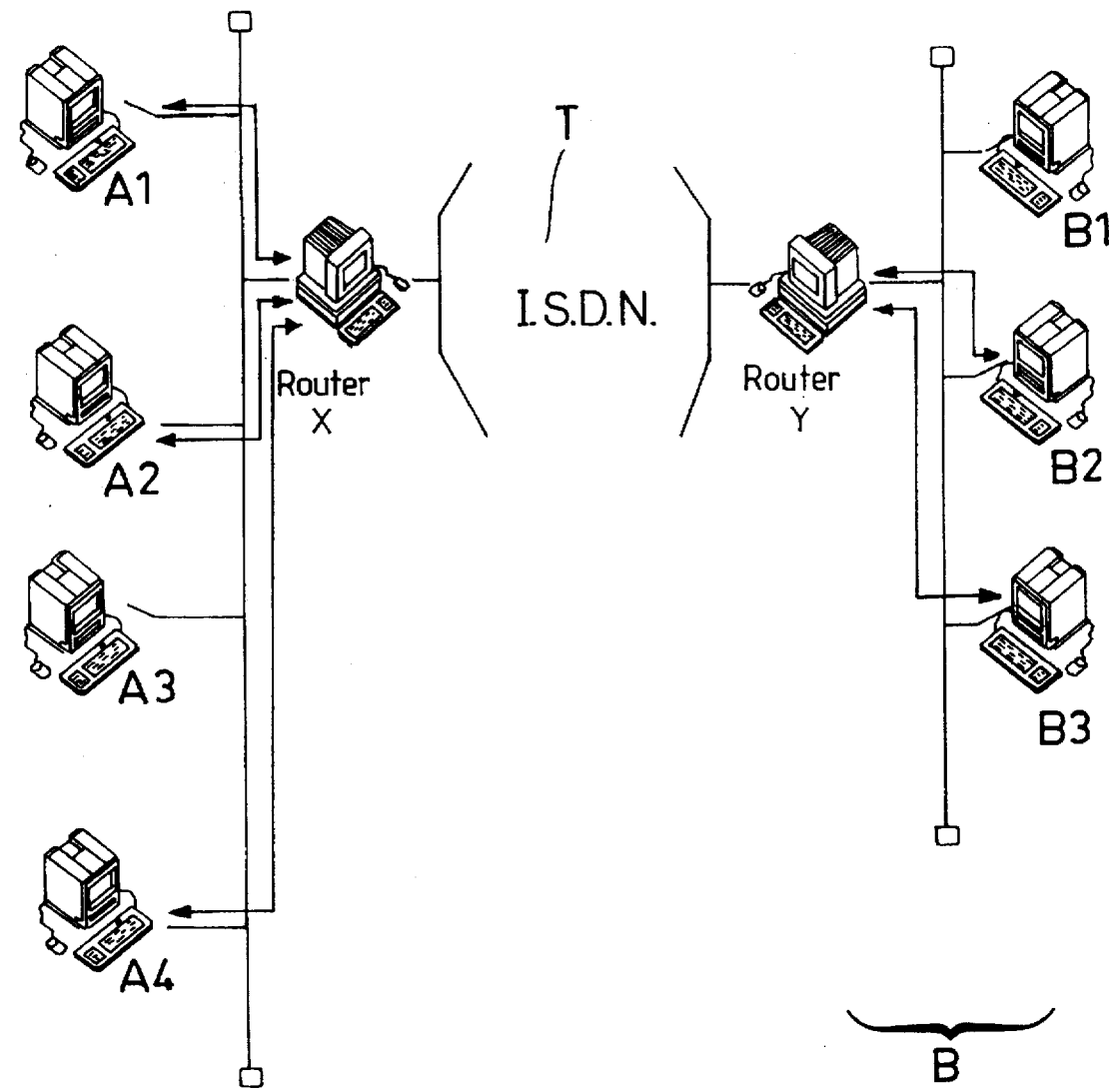
FIG_1

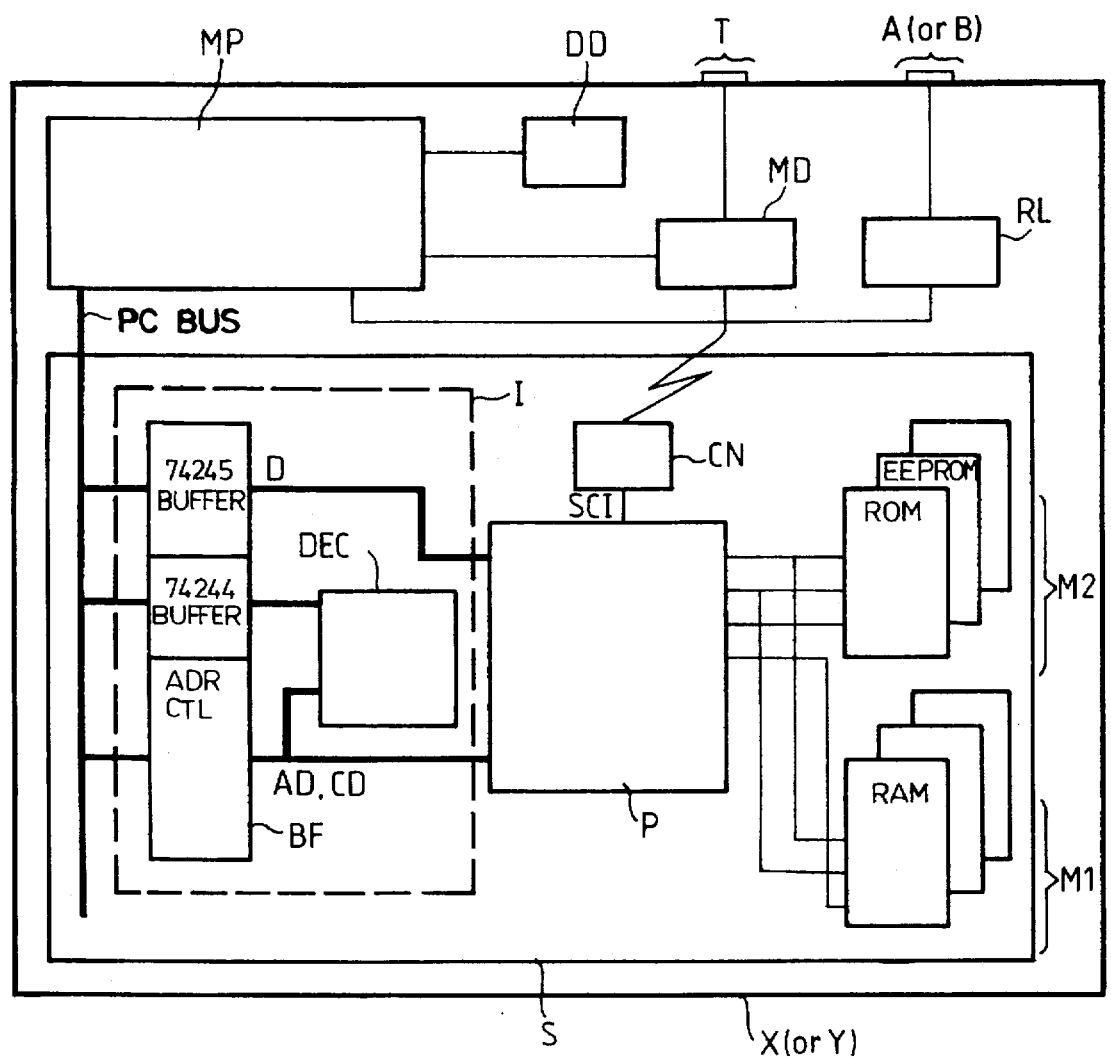
FIG_2

SECURITY PROTECTED SYSTEM FOR INTERCONNECTION OF LOCAL NETWORKS VIA A PUBLIC TRANSMISSION NETWORK

BACKGROUND OF THE INVENTION

The invention relates to a security-protected system for interconnecting local networks via a public transmission network, especially via an integrated-services network (ISDN) such as NUMERIS.

The use of computer systems, linked or not linked to local networks, is often reserved for authorized persons. In fact, whether it involves a PC (personal computer) type microcomputer or a PC-compatible microcomputer operating with the DOS operating system or a workstation (with processing and storage capacity greater than a PC), operating with the UNIX operating system, protection against all use by unauthorized persons is generally provided.

This protection may consist simply, as has just been said, in providing a password in order to protect access to certain files or certain applications. The authorized user will then have to supply his password at the desired time in order to gain access to these protected areas (file, application).

This protection involves the use of a secret code which, needless to say, is known only to the authorized user and to the system. The computer system, for that purpose, contains the secret code in a non-volatile memory which is read and write protected. This system carries out a comparison between the stored secret code and the secret code input by the user in order to authorize or not authorize access to the protected areas.

In the case of a workstation operating with the UNIX operating system, it is access to these stations which is generally protected. In fact, access to these stations can be had only when a connection program is executed, and this program runs only when the name of an authorized user and when the password of this user have been recognized and actually correspond to an authorized user.

The major drawback of this protection by passwords is that these passwords are easily "broken" by an automatic tool, or even simply by being displayed on a screen placed beside the station involved. Moreover, the use of standard commands and of definition files of the Unix system allows a pirate to short-circuit this protection.

The application pertains to in the protection of computer systems in a more general way, and especially in the protection of computer systems linked to a local network and wishing to communicate over a public network.

OBJECT AND SUMMARY OF THE INVENTION

The object of the present invention is to prevent an unauthorized computer system from being able to communicate with another protected computer system over the public network.

The subject of the present invention more particularly is a system for interconnecting local networks via a public transmission network, in which computer systems of the microcomputer or workstation type, connected to a local network A, are capable of being connected to the public network by a router X in order to communicate with one or more computer systems of the microcomputer or workstation type connected to at least one other local network B, which are capable of being linked to the public network by a router Y, this interconnection system being mainly characterized in that it includes means for security protection of the establishment of the communications between the local networks over the public network, implementing a certificate exchange mechanism, and in that these means are placed in the routers.

BRIEF DESCRIPTION OF THE DRAWINGS

The present invention will be better understood with the aid of the description which will follow and which is given by way of illustration and is not limiting, and with regard to the drawings in which:

FIG. 1 represents the hardware architecture of two local networks capable of being connected over a public transmission network such as the ISDN network, FIG. 2 represents a diagram for producing the security protection means.

DETAILED DESCRIPTION OF THE PREFERRED EMBODIMENT

The description which will follow will be given according to an example of a simple architecture, such as represented in FIG. 1, in which two distant local networks are capable of being connected over the public network. Needless to say, the invention is not limited to this embodiment example; it applies equally to interconnection between a number of local networks greater than two.

Moreover, the invention applies equally well to computer systems such as PC-type microcomputers working with a DOS operating system, as to workstations working with the UNIX operating system.

In the remainder of the description, a station will be spoken of for simplicity's sake, this term grouping together all the relevant instances.

In the example which has been represented, the local network A makes it possible to connect the stations A1, A2, A3 and A4 and the router X. The local network B makes it possible to connect the stations B1, B2, B3 and the router Y. The routers X and Y can be connected over the public transmission network T (with ISDN integration of services).

As the arrows in this FIG. 1 symbolize, there is provision, for example, for the users of stations A1 and A2 to be authorized to have two-way communications over the public network. In contrast, the user of station A4 is authorized only to have outgoing communications over this network, and the user of station A3 has no right to any exchange over this network.

The interconnection system proposed according to the invention makes it possible to satisfy these conditions while guaranteeing a level of security obtained by a certificate exchange mechanism based on a crypto-system of the RSA (RIVEST, SHAMIR, ADLEMAN) type.

Thus, according to this example, the users of the network A and of the network B form a closed subscriber group. Possible pirates external to this group will not have an authorized certificate available and will be rejected. Needless to say, as many new groups as desired can be inserted into this closed subscriber group. It will then be sufficient to load the authorization certificates into the routers.

In FIG. 2, the diagram of production of the security protection means installed in each router has been represented.

The router function is carried out by means of a PC-type microcomputer, in which routing software available on the market has been loaded. As an example, the LANXPAND/IP routing software, from the OST company, may be taken.

The router makes it possible, on the one hand, to be connected to the local network and, on the other hand, to be connected to the public network. The routing software establishes the communications after having applied the filtering of the public network addresses and of the local network addresses as will be detailed in what follows.

The router therefore conventionally includes a microprocessor MP equipped with resources and a hard disk DD in which all the start-up programs for the router are loaded, as well as the routing program which performs the filtering of the local network addresses.

According to the invention, the security protection means S make it possible to be connected to the address, data and control bus of the microcomputer by means of an interface T, and to be connected to the public network via a modem MD. The modem function may, for example, be implemented by a modem card available on the market and which is installed in the router.

The security protection means S further include a signal processor P able to implement the authentication mechanisms according to the invention and, in particular, to implement an encryption algorithm such as the algorithm known by the title RSA or any other algorithm based on arithmetic in the ring of integers modulo N. As a processor, the DSP 56000 signal processor may be taken as an example.

Storage means are associated with this processor, such as a program memory M2 and a working memory M1. The program memory M2 is a non-volatile memory loaded with one or more programs for implementing the security algorithm, such as the RSA algorithm.

The program memory is a non-volatile electrically programmable (EPROM) and possibly electrically erasable (EEPROM) memory, for example. The working memory M1 is a RAM-type read and write memory.

A serial link SCI allows the signal processor to gain access to the public network T through the modem MD and a connector CN of RS232 type.

The interface I between the bus of the router and the signal processor is formed by means of a conventional input/output buffer circuit BF for the data lines D and for the address AD and control CD lines.

In accordance with the invention, the certificate table is first of all loaded into each router. A certificate corresponds to an item of information specific to each station. Thus, the router X will include a certificate table TA corresponding to the certificates relating to each station of the network A. The router will include a table TB relating to the certificates allocated to each station of the local network B.

The certificate is an item of information specific to each station and comprises a data item D comprising the following data:

the address of the local network, ADRL, the address of the public network ADRP, the type of station, that is to say a data item T making it possible to know whether a router or a simple station is involved.

Thus, according to the example given in FIG. 1, the certificate table TA relating to the local network A will include the certificates CA1, CA2, CA3, CA4. The certificate table TB will include the certificates CB1, CB2, CB3. These tables have been represented below:

| | TA | | | TB | |
|---|---|---|---|---|---|
| CA1: | ADRL | (A1) | CB1: | ADRL | (B1) |
| | ADRP | (A1) | | ADRP | (B1) |
| | T | (A1) | | T | (B1) |
| CA2: | ADRL | (A2) | CB2: | ADRL | (B2) |
| | ADRP | (A2) | | ADRP | (B2) |
| | T | (A2) | | T | (B2) |
| CA3: | ADRL | (A3) | CB3: | ADRL | (B3) |
| | ADRP | (A3) | | ADRP | (B3) |
| | T | (A3) | | T | (B3) |
| CA4: | ADRL | (A4) | | | |
| | ADRP | (A4) | | | |
| | T | (A4) | | | |

According to the invention each certificate associated with a station in fact corresponds to an item of signed information obtained by application of a known signature algorithm f to the data by means of a secret key s, the verification of the certificate being carried out with the aid of the associated public key p. These certificates thus correspond to signed data D including the local network address ADRL of the station, the public network address ADRP and the identification T of the station; ie. for the station A1: ADRL (A1), ADRP (A1), T (A1).

The tables TA and TB are recorded in the EEPROM memories of the security protection means on each router.

Furthermore, each router has data D available relating to each station (DA1 to DA4 or DB1 to DB3).

Each station thus also has address filtering data available, namely: the local network addresses and the type of communication, for each station. In fact, for each station, an item of data corresponding to the incoming and outgoing communication authorization is associated with the local network address of the station.

A station capable of having two-way communications has an authorized local network address ADRL, and is declared (+). A station not capable of having any communication with the outside is declared (−)

For each address, the incoming and outgoing authorizations are declared. Consequently, in the address filtering file, there are the various indexed cases:

ADRL ++: two-way communications

ADRL +−: incoming communications only

ADRL −+: outgoing communications only

ADRL −−: no communication

These data files describing the type of communication, that is to say the incoming and outgoing authorizations are stored under security protection in the EEPROM memories of the security protection means of each router.

Each router will therefore have in memory all the local network addresses and the type of communication authorized.

In accordance with the invention, when a station, the station A1 of the local network A for example, wishes to communicate with the station B2 of the local network B, the router X verifies that the station A1 actually has an outgoing-authorized local network address ADRL by reading the address filtering data item of this station.

When the router X has verified that the address has actually been declared "authorized", it sends a virtual circuit establishment request over the public integrated-services network (ISDN) to the router Y. The router Y receives this request. In the event that it can successfully establish the connection, it sends the confirmation of the establishment. In the opposite case, if it does not manage to establish the communication, it sends a rejection command.

The router X then sends the signed certificate CA1 over the public network. When the router Y receives this data item CA1, it verifies it by means of the public key p, from the data item DA1 which the router Y has in its address filtering file. If the certificate is verified, then the router Y does not interrupt the communication and the router X can send the service requested by the caller at the station which is calling. In the opposite case the router Y interrupts the communication.

In practice, it is the "ADRL" information fields of the data item D and of the data item DA1 which are compared in order to authenticate the station.

The various exchanges between X and Y have been represented on the authentication table annexed to the description.

In the event or that there has been authentication of the calling station, authentication of the called station is carried out. In the opposite case, the router Y (of the called station) interrupts the communication.

In accordance with the invention, the certificate tables are defined in advance, and loaded into the routers upon installation.

These tables are delivered by a unit which is called "authority". This will generally be one of the routers of the interconnection system.

In order to do that, the router performing the "authority" function will include the signature function in its security protection means, allowing it to obtain all the certificates from the data D which will have been loaded in the memory. Each table obtained will then be loaded into each router by an authorized operator. The authority will consequently include, in ROM or EEPROM memory, the program implementing the RSA-type algorithm, as well as a secret key and a public key in order to carry out the certificate calculations and thus to obtain the various certificate tables.

Thus, the program implements the procedures for active authentication of the calling station with the aid of the "challenge-response" type technique as described by the table below.

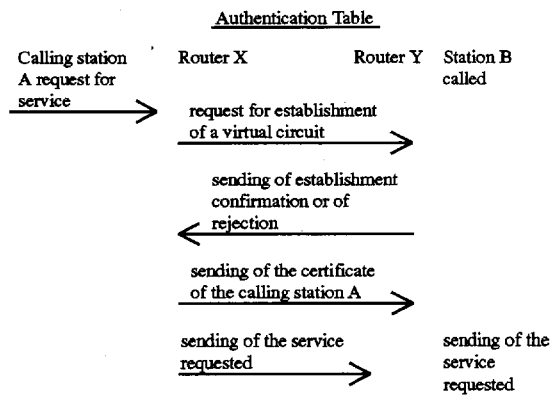

We claim:

1. A system for interconnecting a plurality of local networks via a public transmission network, in which a first plurality of stations, connected to a first local network, are capable of being connected to the public network by a first router in order to communicate with one or more of a second plurality of stations connected to a second local network, the second plurality of stations being capable of being linked to the public network by a second router, and the first and second local networks being included among the plurality of local networks, the system comprising a first security device which protects the establishment of the communications between the first and second local networks over the public network, the first security device implementing an authentication certificate exchange mechanism, and a second security device which protects the establishment of the communications between the first and second local networks over the public network the second security device implementing the authentication certificate exchange mechanism in cooperation with the first security device; and wherein the first and second security devices are respectively placed in the first and second routers.

2. A network interconnection system according to claim 1, wherein the first router includes control and processing means, means for connection to the first local network and means for connection to the public network, and wherein the security protection device includes processing means, means for connecting the control and processing means of the first router to the bus, program and data storage means, the storage means further including a certificate table making it possible to verify, upon each establishment of a communication and sending of the certificate, that the information corresponding to the certificate corresponds to an authorized, indexed station, the procedures for active authentication of the calling station.

3. A network interconnection system according to claim 2, wherein each certificate of the table corresponds to a signed data item indicating a local network address, a public network address, and the type of station to which the certificate corresponds.

4. A network interconnection system according to claim 1, wherein each certificate is signed using a public-key signature algorithm.

5. A network interconnection system according to claim 1, wherein the first router performs a function of certification authority with respect to other routers of the remaining plurality of protected local networks and, to do that, generates a public key-secret key pair allowing it, by means of a signature algorithm, installed in its program memory, to obtain the certificate table to be loaded into the data storage means of the other routers.

6. A network interconnection system according to claim 1, wherein each router includes, in its program memory, a signature verification—algorithm and the public key, so as to verify the validity of the certificate for each incoming call.

7. A method of interconnecting a plurality of protected local networks over a public network, the plurality of protected local networks forming a closed subscriber group, the method comprising the steps of connecting the plurality of protected local networks to the public network, the plurality of protected local networks each including a router and a plurality of stations, and the connecting step being performed by each respective router;

providing network-level protection for each of the plurality of protected local networks, the protection being against unauthorized stations which are external to the closed subscriber group, the protection being network-level protection in that it is provided by each respective router to substantially all of the stations the respective router connects to the public network, the providing step including the step of implementing an authentication certificate exchange mechanism substantially whenever any first station of one of the plurality protected of local networks attempts to initiate a connection with any second station of a different one of the plurality of local networks, the implementing step including the steps of requiring a first router having a first security device to present a certificate on behalf of the first station in order to ensure that the first station is included in the closed subscriber group, the first router being the router which connects the first station to the public network, the requiring step being performed by a second security device of a second router, and the second router being the router which connects the second station to the public network, generating the certificate, the generating step being performed by the first security device, authenticating the certificate, the authenticating step being performed by the second security device, and in response to the authenticating step, permitting the first station to establish a connection with the second station, the permitting step being performed by the second security device; and wherein an unauthorized station is unable to gain access to stations of the closed subscriber group because there is not a router which presents an acceptable certificate on behalf of the unauthorized station.

8. A method according to claim 7, wherein the generating step further comprises the step of accessing a certificate table, the certificate table containing certificates for substantially all of the stations which the first router connects to the public network, the certificates being based on information specific to each individual station.

9. A method according to claim 8, wherein each certificate of the table corresponds to a signed data item indicating a local network address, a public network address, and the type of station to which the certificate corresponds.

10. A method according to claim 9, wherein each certificate is signed using a public-key signature algorithm.

11. A method according to claim 7, wherein the first router performs a function of certification authority with respect to the other routers and, to do that, generates a public key-secret key pair allowing it, by means of a signature algorithm, installed in its program memory, to obtain the certificate table to be loaded into the data storage means of the other routers.

12. A method according to claim 7, wherein each router includes, in its program memory, a signature verification algorithm and the public key, so as to verify the validity of the certificate for each incoming call.

13. A system comprising:

a public network; and a plurality of protected local networks, the plurality of protected local networks being connected to the public network, the plurality of protected local networks forming a closed subscriber group, the plurality of local networks including a first local network and a second local network, the first local network including a first plurality of stations, a first router, the first router connecting the first local network to the public network, the first router including a first security device which further includes a first memory, the first memory storing information specific to each of the first plurality of stations, and a first processor, and the second local network including a second plurality of stations, a second router, the second router connecting the second local network to the public network, the second router including a second security device which further includes a second memory, the second memory storing information specific to each of the first plurality of stations, a second processor, the second processor cooperating with the first processor to implement an authentication certificate exchange mechanism based on the information stored in the first and second memories, the authentication certificate exchange permitting a first station to be connected to a second station, the first station being one of said first plurality of stations of said first local network and the second station being one of the second plurality of stations of the second local network, and wherein the first and second security devices provide network-level protection for the first and second protected local networks, the protection being against unauthorized stations which are not included in the closed subscriber group, the protection being network-level protection in that the first and second security devices respectively provide the protection to all of the stations in the first and second protected local networks, and wherein an unauthorized station is unable to gain access to stations of the closed subscriber group because there is not a router which presents an acceptable certificate on behalf of the unauthorized station.

14. A system according to claim 13, wherein the first and second routers each comprise a certificate table, the certificate table containing certificates for substantially all of the stations which the first router connects to the public network, the certificates being based on information specific to each individual station.

15. A system according to claim 14, wherein each certificate of the table corresponds to a signed data item indicating a local network address, a public network address, and the type of station to which the certificate corresponds.

16. A system according to claim 15, wherein each certificate is signed using a public-key signature algorithm.

17. A method according to claim 13, wherein the first router performs a function of certification authority with respect to the other routers and, to do that, generates a public key-secret key pair allowing it, by means of a signature algorithm, installed in its program memory, to obtain the certificate table to be loaded into the data storage means of the other routers.

18. A method according to claim 13, wherein each router includes, in its program memory, a signature verification algorithm and the public key, so as to verify the validity of the certificate for each incoming call.

* * * * *